3,351,791
CONTROLLED VELOCITY DRIVE
Aubrey H. Smith and Lester T. Christensen, Kenosha, Wis., assignors to Eaton Yale & Towne, Inc., a corporation of Ohio
Filed Sept. 19, 1963, Ser. No. 310,093
19 Claims. (Cl. 310—94)

ABSTRACT OF THE DISCLOSURE

A solid-state speed control is disclosed in which the energization of the field winding of a driven member of a controlled velocity drive, such as an eddy-current coupling, is varied in response to the relative amplitudes of a reference signal and a feedback signal which varies as a function of the coupling output speed. Proportional current feedback is employed to reduce the response time of the control while insuring against undesirable system oscillations.

---

This invention relates to a controlled-velocity drive and more particularly to a solid-state switching control for an electromagnetic coupling device, for example an eddy-current clutch or the like.

Among the several objects of this invention may be noted the provision of a solid-state switching control for an electromagnetic coupling device having improved speed regulation characteristics over a greatly extended speed range; the provision of a speed-control system which is critically damped so that optimum response to speed and load changes is obtained while undesirable system oscillations are inherently resisted; the provision of a control of the class described which has relatively low thermal and inherent drift characteristics; and the provision of a speed-control system which is relatively inexpensive, easily and inexpensively maintained, and which exhibits a high degree of reliability in operation. Other objects and features will be in part apparent and in part pointed out hereinafter.

Essentially the invention relates to a control circuit to be employed in a controlled-velocity drive having a driven member, an electromagnetic coupling provided with a control winding, a source of electrical power, and a solid-state switching device, for example a silicon controlled recifier, interconnected between the source and the control winding and adapted selectively to control the energization of this winding thereby to regulate the angular velocity of said driven member. This control comprises means for producing a reference voltage proportional to a preselected angular velocity of the driven member, a first feedback circuit including a tachometer for sensing the angular velocity of the driven member and producing a first feedback signal which varies as a function thereof, and a second feedback circuit responsive to the current through said winding and providing a second feedback signal which varies as a function of this current. The control further comprises means responsive to the reference voltage and to the first and second feedback signals for selectively actuating the solid-state switching device to maintain the angular velocity of the driven member substantially equal to the preselected angular velocity.

According to another aspect of the invention, the control for the solid-state switching device comprises a capacitor and a charging circuit for this capacitor which includes a first electronic transducer, for example a transistor, interconnected with the capacitor, the conductivity of this transducer controlling the charging rate of the capacitor. The control further comprises means for varying the conductivity of the first transducer as a function of the angular velocity of the driven member thereby to control the charging rate of the capacitor as a function of this angular velocity. Also included is a trigger circuit responsive to the voltage across the capacitor for pulsing the switching device thereby causing energization of the control winding of the electromagnetic coupling device when the voltage across the capacitor reaches a pre-established or predetermined level. And finally included is a second transducer, for example a second transistor, interconnected with the first transducer for compensating for variations in the charging rate of the capacitor brought about by varying ambient temperature conditions. In a specific embodiment of this latter control, the first and second transistors are interconncted to form a differential amplifier which inherently compensates for varying temperature conditions thereby obviating thermal drift problems.

The invention accordingly comprises the control system hereinafter described, the scope of the invention being indicated in the following claims.

In the accompanying drawings, in which one of various possible embodiments of the invention is illustrated, FIG. 1 is a block diagram illustrating functionally the major components of this invention and their interconnection;

Corresponding reference characters indicate corresponding parts throughout the several views of the drawings.

Figure 1:
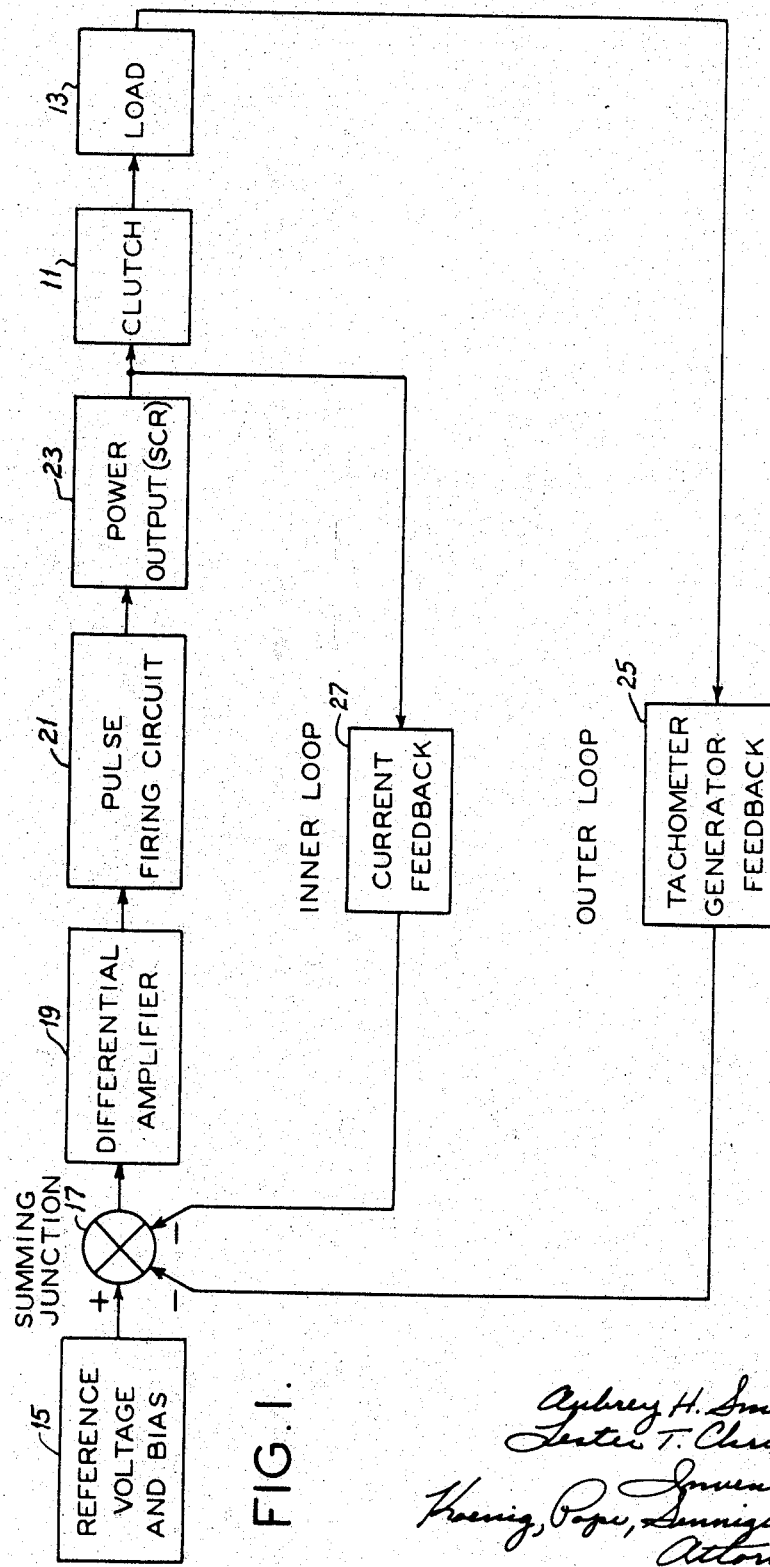

Referring now to the drawings, and more particularly to FIG. 1, the present invention comprises a solid-state switching control for selectively energizing the field or control winding of an electromagnetic slip coupling device, for example an eddy-current clutch. This clutch is indicated by the block 11 in FIG. 1. It functions to couple power from a rotating driving member (not shown) to a load or driven member indicated at 13. The control serves to energize this clutch to maintain the angular velocity of the driven member equal, or substantially equal (for example within 1% regulation), to a preselected or desired angular velocity. A reference voltage source 15 is provided to supply a reference voltage having magnitude proportional to this preselected angular velocity. This reference voltage is applied to a summing junction indicated at 17 which, as explained in connection with FIG. 2, comprises a solder junction within the control circuit. The outputs of two negative feedback loops disclosed hereinafter are also applied to junction 17. The composite output of this junction (i.e., the algebraic sum of the signals applied thereto) is in turn applied to the input of a differential amplifier 19 which serves to control the triggering of a pulse firing circuit 21. The latter controls the energization of a solid-state switching device, 23 which may for example include a silicon controlled rectifier and which serves to control the energization of clutch 11 substantially in proportion to the sum of the reference voltage and the two feedback signals to maintain the speed of the driving member 13 equal to the preselected speed.

A tachometer generator 25 is driven by the driven member to sense the angular velocity thereof. The output of this generator is applied as indicated to summing junction 17 to form a negative feedback circuit responsive to incipient variations in the speed of the driven member under control. As indicated in FIG. 1, this tachometer generator feedback forms an outer feedback loop. An inner feedback loop is provided by a current feedback control indicated at 27. This latter circuit responds to changes in the energization of or current through the clutch coil 11 and acts to modify the power output accordingly. As explained hereinafter, this current feedback forms a high gain sensitivity feedback loop which lessens the response time of the control while insuring against undesirable system oscillations.

Figure 2:
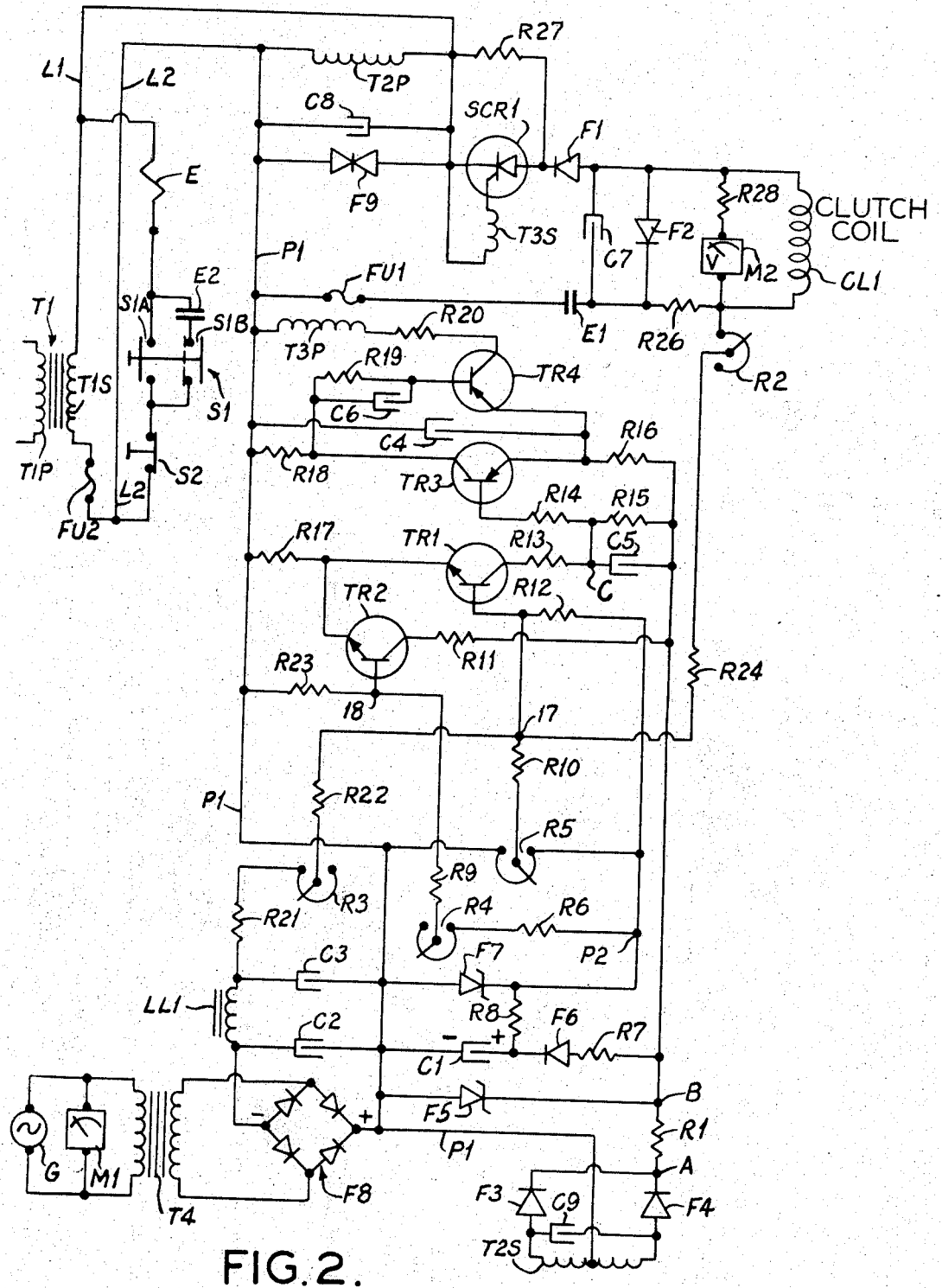
FIG. 2 is a schematic circuit diagram of the FIG. 1 system.

Referring now to FIG. 2 which illustrates the individual components which make up the FIG. 1 system and their interconnection, power for the control system is provided by a transformer T1 having a primary winding T1P and a secondary winding T1S. The former may be connected across a 220 v. or 440 v. A.C. source, for example, while the latter supplies A.C. power to the control circuit at 115 v. A.C. Connected across secondary winding T1S by a pair of conductors L1 and L2 and a fuse FU2 is the primary winding T2P of second transformer T2 which includes a center-tapped secondary winding T2S (shown at the bottom portion of the FIG. 2 schematic). A conventional "Jog-Run-Stop" control for the electromagnetic coupling device is provided by a jog-run switch S1 (having a first portion S1A and a second portion S1B), a stop switch S2, and a relay, the coil of which is indicated at E and the normally open contacts of which are shown at E1 and E2. To provide a momentary energization of the clutch winding (i.e., to provide a jog control) switch portion S1A is closed momentarily (contacts S1B remaining open) thereby energizing coil E and closing contacts E1 for a brief period. If the clutch is to remain energized (i.e., if a "run" operation is called for), both portions or contacts of switch S1 are closed. This not only energizes coil E, but also completes a holding circuit through contacts S1B and E1 to maintain coil E energized until stop switch S2 is opened.

The reference voltage and bias supply of the FIG. 1 control is illustrated in FIG. 2 as including transformer T2, the center-tapped secondary of which is connected to supply power to a pair of rectifying diodes F3 and F4 which provide an unfiltered full-wave-rectified pulsating D.C. potential between a point or junction A and the center tap of secondary winding T2S. The latter is connected to a junction or bus P1 which forms the common bus of the circuit. A capacitor C9 is connected across winding T2S to provide a low impedance shunt to high frequency line transients. In addition to protecting diodes F3 and F4, this capacitor C9 serves to prevent misfiring of the pulse firing circuit described below. This wave form of the potential at point A with respect to point P1 is shown at A in FIG. 3.

A current limiting resistor R1 is connected in series with a Zener diode F5. The latter provides a clipping action thereby providing at point B a wave form as illustrated in FIG. 3B. The average D.C. potential of this FIG. 3B potential (again with respect to point P1) is +12 volts ±10%. The unfiltered potential appearing at point B is employed to provide power to the differential amplifier and the pulse firing circuit both described hereinafter. Because Zener diode F5 is not temperature compensated, the average D.C. potential at point B may vary with temperature.

A temperature compensated reference and bias supply portion of the circuit is interconnected with point B by a current limiting resistor R7 and an isolating or blocking diode F6. A filtering or smoothing capacitor C1 is connected between the cathode of diode F6 and point P1. The potential across this capacitor may be, for example, on the order of 11.5 v. D.C. Diode F6 prevents this potential from being applied to the differential amplifier or pulsing circuit. Connected across capacitor C1 is a regulating resistor R8 connected in series with a temperature compensated Zener diode F7. This series circuit provides a temperature compensated continuous D.C. potential between a point P2 and junction P1. This reference potential may have a value, for example, of from +8.55 v. to +9.45 v.

A rheostat or variable resistance R4 and a pair of fixed resistances R6 and R9 are connected in series between point P2 and a negative summing junction indicated at reference numeral 18. As will be apparent hereinafter, the setting of variable resistance R4 determines the minimum current through the clutch oil when the control is set for zero run speed.

A potentiometer R5 which constitutes the reference or run speed potentiometer is connected across points P1 and P2, and the movable arm or slider of this potentiometer is connected by a resistor R10 to the positive summing junction or point 17, this point corresponding to junction 17 in FIG. 1. Potentiometer R5 may be set to any desired or preselected angular velocity of the driven member and provides at its movable arm a voltage which is proportional to or an analog of this preset velocity.

The tachometer feedback portion of the FIG. 2 control includes an A.C. generator or tachometer G mounted on the output shaft of the eddy-current coupling device. This generator has a voltage and frequency output which varies as a function of, or is proportional to, the output shaft velocity. A meter M1 is connected across the output of generator G to provide an indication of this output. Generator G feeds an isolation transformer T4 and a full-wave bridge type rectifier indicated at F8. The output of rectifier F8 is filtered by a smoothing network or circuit consisting of a pair of capacitors C2 and C3 and a choke coil LL1. The latter is a swinging choke effective only at very low frequencies and currents. The rectified and filtered output of feedback generator G is applied through a pair of fixed resistors R21 and R22 series connected with a rheostat R3 to summing junction 17.

Variable resistance R3 constitutes a control the setting of which determines the maximum speed of the driven member or load. The proper adjustment for resistance R3 is made with the run speed potentiometer R5 set at its maximum speed setting under rated load conditions. Rheostat R3 is then adjusted so that the output of the coupling is rotated at the nameplate maximum rated output speed.

It will be appreciated that because the reference potential appearing at the movable arm of potentiometer R5 has a polarity which is opposite to the polarity of the tachometer feedback signal appearing at the arm of rheostat R3 (the former being positive with respect to point P1 and the latter being negative with respect thereto), the currents applied to summing junction 17 have opposite signs, i.e., the current from the reference potentiometer flows into this point whereas current flows from the summing junction through resistor R2. Current also flows from this junction through a resistor R24 which, as explained hereinafter, constitutes a portion of the inner or current feedback loop. The algebraic sum of these currents is applied to the control electrode or base of a transistor TR1 which constitutes one of the transistors of the differential amplifier portion of the control. The other transistor of this amplifier is indicated at TR2.

A common emitter resistor R17 is interconnected between the emitters of transistors TR1 and TR2 and point P1, and a pair of matched load resistors R11 and R13 are connected to the respective collectors of these transistors. Resistor R11 is connected directly to point B while resistor R13 is connected to one terminal of a capacitor C5, the other terminal of which is connected to junction B. A current limiting resistor R12 connects the base of transistor TR1 with terminal P2. A similar resistor R23 connects the base of transistor TR2 with terminal or junction P1. The common connection between elements R13 and C5, point or junction C, constitutes the output terminal of the differential amplifier. The wave form of the potential appearing at the point C is illustrated in FIG. 3C. This potential, as explained hereinafter, controls the triggering and toggling of the pulse firing circuit, the latter in turn controlling the actuation of the solid-state switching device.

The pulse firing circuit consists of a modified Schmitt trigger circuit. A pair of transistors TR3 and TR4 are interconnected with a common emitter resistor R16 and a pair of matched load resistors R18 and R20 and a coupling network consisting of a resistor R19 and a shunt-connected capacitor C6 interconnects the collector of transistor TR3 with the base of transistor TR4 thereby constituting a conventional Schmitt trigger circuit. This trigger circuit is modified by the addition of a filtering capacitor C4 between common emitter resistor R16 and point P1 which maintains the threshold level of the Schmitt trigger circuit substantially constant regardless of transients in the system. The output of the differential amplifier appearing at point C is coupled through a current limiting resistor R14 to the base of transistor TR3. The common connection between resistor R14 and capacitor C5 is connected to point B by a resistor R15.

The output of the pulse firing circuit is coupled by an isolating pulse transformer to the gate electrode of a silicon controlled rectifier SCR1, the latter constituting the solid-state switching device mentioned above. The SCR1 and its associated components make up the power output portion of the control. The primary of the pulse transformer, indicated at T3P, is connected in the output circuit of the modified Schmitt trigger, between load resistor R20 and point P1. The secondary winding of this transformer is connected between the gate or control electrode of SCR1 and its cathode.

The field or control winding of the electromagnetic clutch or coupling device under control is indicated at CL1. This coil is connected in series with a fuse FU1, contacts E1, a resistor R26, a diode F1, and the anode-cathode circuit of SCR1, and the resulting series loop is connected across lines L1 and L2. A back rectifier F2 connected across coil CL1 shorts out off-cycle transients in the coil, making the latter appear, for all practical purposes, to be a resistive load. Diode F1 and a resistor R27 are secondary protective devices which serve to protect the controlled rectifier SCR1 from high PIV's and also to prevent misfiring thereof from high transient voltages. Transient suppression capacitors C7 and C8 are connected respectively across clutch coil CL1 and secondary winding T2P to provide low impedance paths for high frequency transients appearing in the circuit. A surge resistor indicated at F9 is connected across winding T2P to protect the circuit from low frequency line transients.

A voltmeter M2 in series with a resistor R28 is connected across coil CL1 to provide a continuous indication of the degree of energization or excitation thereof.

The current feedback portion of the control which senses the current through coil CL1 is illustrated as comprising a resistor R26 and a series circuit consisting of a rheostat R2 and resistance R24. Resistor R26 is in series with the clutch coil, and hence the potential across this resistor is proportional to or a function of the current through the coil. This potential signal is fed to the positive summing junction 17 by the variable resistance network consisting of rheostat R2 and resistor R24. The net potential provided at junction 17 is thus substantially proportional to the sum of the reference voltage and the tachometer and current feedback signals.

Operation of the FIG. 2 control is as follows:

The low bias rheostat R4 is initially adjusted to establish a minimum current level through the clutch coil when the run speed potentiometer R5 is set at zero. It has been established that in a typical case rheostat R4 should be adjusted to provide for 5% excitation of the clutch coil when the run speed potentiometer is set at zero. This setting produces optimum thermal drift characteristics.

The run speed potentiometer R5 is then adjusted or set to the desired angular velocity of the driven member. A properly calibrated knob or dial, for example, could be provided to facilitate this adjustment. Switch S1 is then actuated to its "run" position. As explained above, this latter action completes a circuit which energizes relay coil E thereby causing normally open contacts E1 and E2 to close. The closing of contacts E2 establishes a holding circuit for coil E, while the actuation of contacts E1 connects the series circuit including the clutch coil CL1 and SCR1 across lines L1 and L2. Thereafter, the degree of energization of the clutch coil depends upon the selective actuation of SCR1, or more particularly, the period or length of time during which this SCR1 is rendered conductive during a cycle of the A.C. appearing across L1 and L2. It will be appreciated that because of the polarity of diode F1 and SCR1, coil CL1 can only be energized during the negative half-cycles of this A.C. potential.

Adjustment of potentiometer R5 causes a positive potential having a value proportional to the preset speed to be coupled through resistance R10 to the base of transistor TR1. Since the emitter-collector circuit of this transistor is series-connected with capacitor C5, the conductivity of this transistor controls the charging rate of this capacitor. Stated somewhat differently, capacitor C5, resistor R13, the emitter-collector circuit of TR1, and resistance R17 constitute an RC circuit, the R of which is controlled by the base-emitter potential of transistor TR1. Thus, increasing the positive potential at summing junction 17 causes capacitor C5 to charge at a more rapid rate.

Since the potential across a capacitor cannot change instantaneously, the potential at point C builds up concurrently with the leading edge of a pulse at point B. Initially, i.e., in the quiescent state, transistor TR4 of the modified Schmitt trigger circuit is conducting and transistor TR3 cut off. As the potential at point C builds up to exceed the threshold level of the Schmitt trigger (assumed for purposes of explanation to be 10 volts), transistor TR3 is triggered into conduction. Periods of conduction of TR3 are shown in FIG. 3D. Concurrently, transistor TR4 is cut off or rendered nonconducting. This causes a negative-going pulse (shown in FIG. 3E) to be coupled through secondary winding T3S to the gate of SCR1, thereby insuring that the SCR is in its off or nonconducting state during periods of conduction of transistor TR3.

The charging of capacitor C5 causes the potential at point C to decrease at a rate proportional to the charging rate of the capacitor. This decreasing potential is indicated at C' in FIG. 3C, the downward slope of this portion being a function of the conductivity of transistor TR1. Transistor TR3 remains conducting until the portion C' reaches the 10-volt trigger level of the Schmitt circuit, at which time transistor TR3 is cut off. This causes conduction of transistor TR4 which in turn causes a positive pulse spike or triggering signal to be coupled to the gate or control electrode of SCR1. Assuming proper polarity of the A.C. potential across L1 and L2, this spike or triggering signal causes conduction of SCR1 and concurrent energization of coil CL1. The pulse applied to this coil is shown in FIG. 3F, it being assumed that during the first half-cycle of the FIG. 3 wave forms line L1 is negative with respect to line L2.

It will be apparent that the duration of the pulse shown in FIG. 3F (and hence the degree of energization of the coil CL1) is dependent solely on the charging rate of capacitor C5. This charging rate is in turn dependent upon the potential at junction 17 which, in turn, is the input signal applied to transistor TR1 at its control or base electrode. As noted previously, this input signal comprises the sum of the reference voltage and the tachometer and feedback signals and the energization of the clutch is thus substantially proportional to this sum throughout the range of operation of the control.

Figure 3:
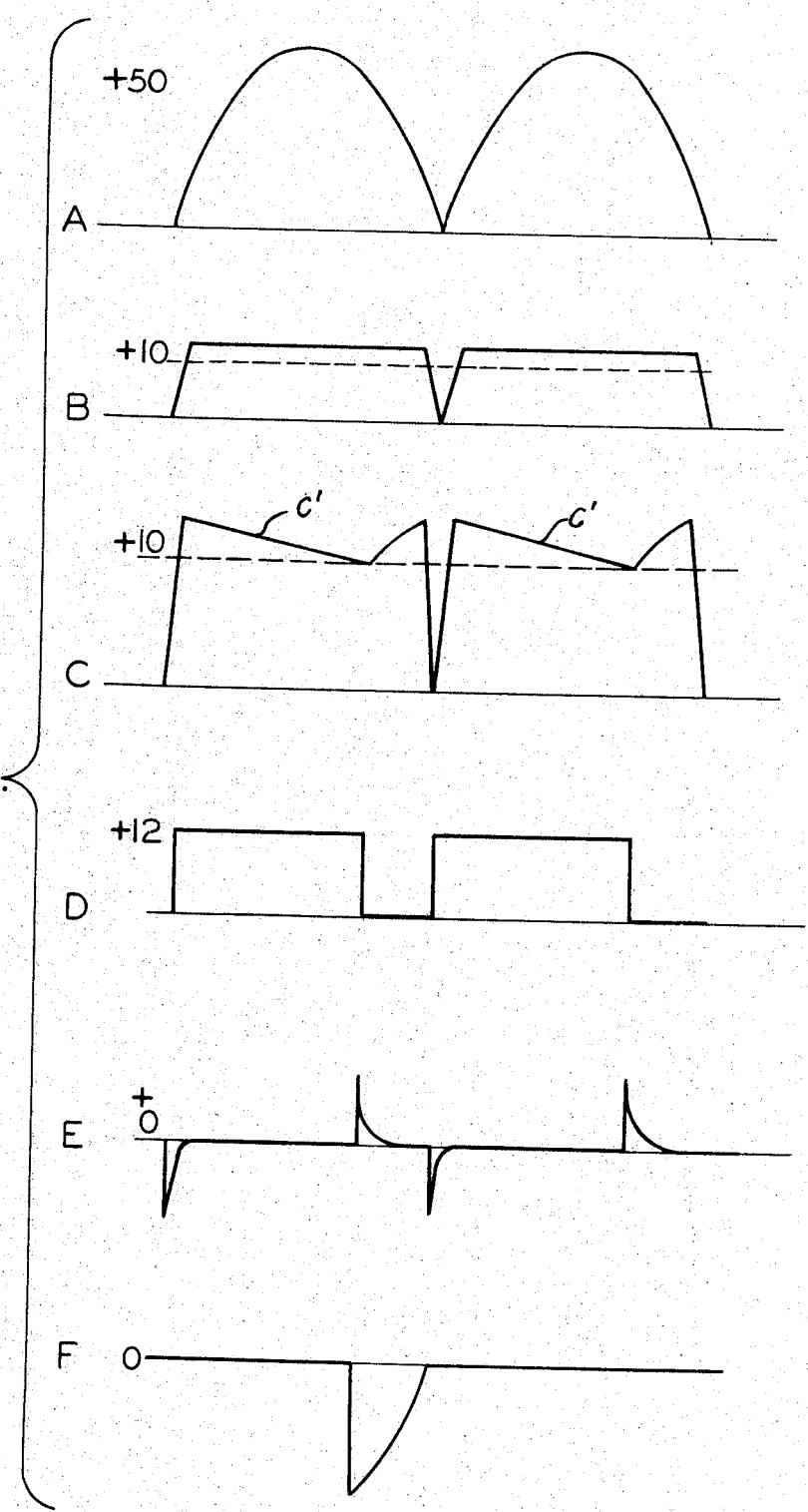
FIG. 3 illustrates various wave forms useful in explaining the operation of the FIG. 2 control.

During the subsequent half-cycle of the FIG. 3 wave forms the same control functions take place, i.e., the pulse firing circuit again triggers the gate of SCR1; however, a pulse is not applied to the clutch coil since line L1 is positive with respect to line L2. It will be understood that if a pair of SCR's are interconnected with coil CL1 to form a full-wave configuration (as opposed to the half-wave arrangement illustrated in FIG. 2), a pulse having a controlled duration would be applied to coil CL1 during each half-cycle of the A.C. applied to lines L1 and L2.

Energization of coil CL1 couples the driving member (for example a motor) with the rotatable driven member or load 13. The angular velocity of the driven member depends for the most part on the degree of energization of coil CL1. To sense this angular velocity and feed back a control signal proportional thereto, tachometer generator G is, as mentioned above, mounted on the output shaft of the coupling device. Immediately after initial energization of coil CL1, the output of the generator feedback (coupled through resistor R2 to point 17) is at a very low value. Consequently, the positive potential at summing junction 17 is at a relatively high value. This increases the conductivity of transistor TR1, causes capacitor C5 to be charged at a rapid rate, and thereby increases the power supplied to the clutch coil through SCR1. This increases the coupling between the driving and driven members, increasing the speed of the latter. The resulting increase in speed is sensed by generator G which provides an increasingly negative voltage to point 17, reducing the base-emitter bias on transistor TR1 and thereby reducing the charging rate of capacitor C5. This in turn reduces the time or duration of the period during which SCR1 is conductive and thus reduces the degree of energization of coil CL1. When the speed of the driven member reaches the preset level, the current supplied to coil CL1 is sufficient merely to maintain this desired speed. Excursions in the actual speed of the load above or below the desired speed are sensed by the tachometer feedback, and the power to coil CL1 is either increased or decreased, whichever action is necessary to bring the actual speed back to the desired level.

To provide a tighter speed control, i.e., to maintain the speed of the driven member more nearly equal to the preset speed, and to decrease the response time of the system, an inner feedback loop senses the current through the clutch coil CL1 and applies a negative feedback signal to point 17 which is proportional to this current throughout the range of clutch energization. This inner loop consists of resistor R26 and series resistors R2 and R24. Once the desired speed has been attained, incipient variations in the current through coil CL1 are reflected back to the summing junction 17 in the form of a degenerative feedback. This degenerative feedback requires a somewhat higher overall gain for the system; however, depending on the setting of rheostat R2, the response time can be considerably reduced, for example, by a factor of 10. And since this response time can be reduced synthetically, a system which would be unstable can be made to be stable. For example, if the closed loop is unstable with a total response time $T$ equal to .3 second, reducing this response time synthetically to a value of .03 second assures that the system will be stable. This not only insures against system oscillations, but also permits the design of a system which is critically damped.

To reduce thermal drift in the speed regulation caused by varying ambient temperature conditions, a differential amplifier configuration is provided to control the charging rate of capacitor C5. The beta gain of a transistor, i.e. the D.C. bias gain, varies considerably as a function of temperature. As temperature increases, the base-emitter resistance of a transistor decreases, and if a fixed base-emitter bias is applied, this decrease in resistance brings about an increase in the base-emitter current. This in turn causes an appreciable increase in the collector-emitter resistance. Thus, if transistor TR1 alone were provided to control the charging rate of capacitor C5, this charging rate would vary as a result of temperature variations. Transistor TR2, however, in effect operates as a temperature compensating transducer which maintains the conductivity of transistor TR1 substantially independent of temperature changes.

Transistors TR1 and TR2 are preferably mounted in a common heatsink, physically coupled together so that the two transistor cases are at substantially the same temperature. Thus an increase in the temperature of TR1 (causing an increase in the conductivity thereof) is accompanied by a corresponding increase in the temperature of TR2. This increases the conductivity of the collector-emitter circuit of TR2 causing in turn an increase in the current through common emitter resistor R17. The increased current through R17 raises the positive potential at the emitter of transistor TR1, thereby altering the base-emitter bias of this transistor TR1. If the two transistors are selected to have approximately equal gains, the variation in the base-emitter bias of transistor TR1 just compensates for the temperature-induced base-emitter resistance variation. This insures that the base-emitter current of TR1 (the parameter which controls the conductivity of the collector-emitter circuit thereof) remains substantially independent of temperature changes.

In one specific application of the FIG. 2 control, the speed regulation was within ±1% over a controlled speed range of 33 to 1. This is to be compared with prior-art systems wherein a good value of speed regulation is ±2% over a 10 to 1 speed range. The damping factor was somewhat greater than .7 and approached the optimum factor of .707; the thermal drift was less than .02% per ° F.; and the inherent drift (i.e. changes in speed caused, for example, by diode commutations, transistor shot noises, SCR commutations, damped oscillations from the LC network, etc.) was less than ± one r.p.m. at all operating speeds within the speed range.

In view of the above, it will be seen that the several objects of the invention are achieved and other advantageous results attained.

As various changes could be made in the above constructions and circuits without departing from the scope of the invention, it is intended that all matter contained in the above descripion or shown in the accompanying drawings shall be interpreted as illustrative and not in a limiting sense.

What is claimed is:

1. In a controlled-velocity drive having a driven member, and a winding the energization of which controls the speed of said driven member, a source of electrical power, and a solid-state switching device interconnected between said source and said winding and adapted selectively to control the energization of said winding thereby to regulate the angular velocity of said driven member; a control for said switching device comprising means for producing a reference voltage proportional to a preselected angular velocity of said driven member, a first feedback circuit sensing the angular velocity of said driven member and producing a velocity feedback signal which varies as a function thereof, a second feedback circuit including a resistor in series with said winding for providing a current feedback signal which varies substantially in proportion to the current through said winding, and means responsive to said reference voltage and to said first and second feedback signals for selectively actuating said switching device to energize said winding substantially in proportion to the sum of said reference voltage and said velocity and current feedback signals substantially throughout the range of operation of said control thereby to maintain the angular velocity of said driven member substantially equal to said preselected angular velocity.

2. In a controlled-velocity system as set forth in claim 1, said second feedback circuit further comprising a variable resistance interconnected with said resistor, the setting of said variable resistance determining the amplitude of said current feedback signal.

3. In a controlled-velocity drive as set forth in claim 1, said means for selectively actuating said switching device comprising a Schmitt trigger circuit, a capacitor, means for charging said capacitor at a rate dependent on the difference between the angular velocity of said driven member and said preselected angular velocity, and means for triggering said Schmitt trigger circuit when the potential across said capacitor reaches a predetermined threshold level.

4. In a controlled-velocity system as set forth in claim 3, said means for charging said capacitor comprising a first transistor connected in series with said capacitor, the conductivity of said first transistor controlling the charging rate of said capacitor, and a second transistor interconnected with said first transistor for compensating for variations in the conductivity of said first transistor brought about by varying ambient temperature conditions.

5. In a controlled-velocity drive as set forth in claim 4, further including a source of pulsating D.C. potential, means for applying a series of D.C. pulses from said source to the series circuit formed by said first transistor and said capacitor, whereby the potential at one terminal of said capacitor builds up concurrently with the leading edge of each of said pulses and thereafter decreases at a rate proportional to the charging rate of said capacitor, the potential at said terminal controlling the triggering of said Schmitt trigger circuit.

6. In a controlled-velocity drive as set forth in claim 5, said means for producing a reference voltage proportional to said preselected angular velocity comprising a potentiometer connected across a source of reference potential, means for applying D.C. pulses from said source of pulsating D.C. potential to said source of reference potential, and means for isolating said reference source from said capacitor and said Schmitt trigger circuit.

7. In a controlled-velocity drive as set forth in claim 1, said first feedback circuit comprising an A.C. generator driven at the angular velocity of said driven member, a full-wave rectifier and smoothing circuit responsive to the output of said A.C. generator for providing a D.C. potential proportional thereto, and means for combining said D.C. potential with said reference voltage thereby to provide a composite signal the magnitude of which is a function of the difference between the angular velocity of said driven member and said preselected angular velocity.

8. In a controlled-velocity drive as set forth in claim 1, said switch device comprising a silicon controlled rectifier, the anode-cathode circuit of which is connected in series with said winding whereby the average conductivity of said anode-cathode circuit controls the degree of energization of said winding.

9. In a controlled-velocity drive having a driven member, an electromagnetic coupling provided with a winding, a source of electrical power and a solid-state switching device interconnected between said source and said winding and adapted selectively to control the energization of said winding thereby to regulate the angular velocity of said driven member; a control for said switching device comprising a capacitor, a charging circuit for said capacitor including a first electronic transducer interconnected with said capacitor, the conductivity of said first transducer controlling the charging rate of said capacitor, means for varying the conductivity of said first transducer as a function of the angular velocity of said driven member thereby to control the charging rate of said capacitor as a function of said angular velocity, a trigger circuit responsive to the voltage across the capacitor for pulsing said switching device thereby to cause energization of said winding when said voltage reaches a preestablished level, and a second transducer interconnected with said first transducer for compensating for variations in the charging rate of said capacitor brought about by varying ambient temperature conditions.

10. In a controlled-velocity drive as set forth in claim 9, said first and second transducers comprising first and second transistors positioned in a common heatsink arrangement, said first and second transistors being interconnected to form a differential amplifier configuration wherein a variation in the conductivity of said first transistor caused by a temperature-induced variation in the base-emitter resistance thereof is compensated for by a variation in the conductivity of said second transistor which effects a compensating change in the base-emitter bias of said first transistor.

11. In a controlled-velocity drive as set forth in claim 9, said means for varying the conductivity of said first transducer comprising a summing junction, a first feedback circuit including a tachometer for sensing the angular velocity of said driven member and producing a first negative feedback signal which varies as a function thereof, means for producing a reference voltage proportional to a preselected angular velocity of said driven member, means for applying said reference voltage and said first feedback signal to said summing junction, and means interconnecting said summing junction with a control electrode of said first transducer to vary the conductivity thereof as a function of the difference between the angular velocity of said driven member and said preselected angular velocity.

12. In a controlled-velocity drive as set forth in claim 11, further including a second feedback circuit responsive to the current through said winding and providing a second feedback signal which varies as a function thereof, and means for applying said second feedback signal to said summing junction whereby variations in said current cause variations in the conductivity of said first transducer.

13. In a controlled-velocity system as set forth in claim 12, said second feedback circuit including a resistor connected in series with said winding, the potential across said resistor being proportional to the current through said winding, and wherein said means for applying said second feedback signal to said summing junction includes a variable resistance connected between said resistor and said summing junction.

14. In a controlled-velocity system as set forth in claim 10, said trigger circuit comprising a pair of transistors interconnected to form a Schmitt trigger circuit configuration.

15. A control for varying the duration of the period of conduction of a controlled rectifier during a cycle of A.C. supply voltage, said control comprising:
a capacitor;
means responsive to a variable amplitude input signal for charging said capacitor at a rate which varies as a function of the amplitude of said input signal; and
means, including a Schmitt trigger circuit connected to said capacitor, for generating a triggering signal to cause said controlled rectifier to conduct when the charge on said capacitor reaches a predetermined level whereby the time within said A.C. supply voltage cycle at which said triggering signal is generated is a function of the amplitude of said input signal.

16. A control as set forth in claim 15 wherein said means for charging said capacitor includes a transistor.

17. A control as set forth in claim 15 wherein said means for charging said capacitor comprises a first transistor connected in series with said capacitor, the conductivity of said first transistor controlling the charging rate of said capacitor, and a second transistor interconnected with said first transistor for compensating for variations in conductivity of said first transistor brought about by varying ambient temperatures.

18. A control for varying the duration of the period of conduction of a controlled rectifier during a cycle of A.C. supply voltage, said control comprising:
a capacitor;
means responsive to a variable amplitude input signal comprising a first transistor for charging said capacitor at a rate which varies as a function of the amplitude of said input signal, and a second transistor interconnected with said first transistor for compensating for variations in the conductivity of said first transistor brought about by varying ambient temperature; and means for generating a triggering signal causing said controlled rectifier to conduct when the charge on said capacitor reaches a predetermined level whereby the time within said A.C. supply voltage cycle at which said triggering signal is generated is a function of the amplitude of said input signal.

19. A control as set forth in claim 18 wherein said first and second transistors comprise a differential amplifier.

References Cited

UNITED STATES PATENTS 3,293,465  12/1966  Zeller _____ 310—94

MILTON O. HIRSHFIELD, *Primary Examiner.*

D. X. SLINEY, *Examiner.*